Patented May 8, 1934

UNITED STATES PATENT OFFICE 1,957,936

MANUFACTURE OF AMINO-DIHYDROXY-ANTHRAQUINONES

Edwin C. Buxbaum, Shorewood, and Henry R. Lee, South Milwaukee, Wis., assignors to E. I. du Pont de Nemours & Company, Wilmington, Del., a corporation of Delaware No Drawing. Application September 14, 1932,
Serial No. 633,084

10 Claims. (Cl. 260—59)

This invention relates to the manufacture of organic compounds. More particularly, it deals with the manufacture of amino-anthrarufins and amino-chrysazins, such as 4-amino-1,5-dihydroxy - anthraquinone, 4-amino-1,8 - dihydroxyanthraquinone, 4,8-diamino-1,5 - dihydroxy - anthraquinone and 4,5-diamino-1,8-dihydroxy-anthraquinone.

It is an object of this invention to provide an efficient and economical process for the manufacture of the above compounds.

It is a further object of this invention to combine with said process of manufacture an efficient method for recovering the said compounds in a state of high purity.

Other and further important objects of this invention will appear as the description proceeds.

According to our invention, 1,5- or 1,8-dimethoxy-anthraquinone is nitrated to produce 4-nitro-1,5-dimethoxy-anthraquinone, 4-nitro-1,8-dimethoxy - anthraquinone, 4,8-dinitro - 1,5 - dimethoxy-anthraquinone, or 4,5-dinitro-1,8-dimethoxy - anthraquinone. These intermediates are in turn reduced to give the corresponding amino compounds which are then subjected to hydrolysis giving the above described aminohydroxy-anthraquinone compounds.

We have found that the amino-methoxy-anthraquinone compounds above indicated can be hydrolyzed to produce the corresponding aminohydroxy compounds. Concentrated sulfuric acid furnishes an excellent medium for effecting this hydrolysis. Moreover, when this medium is used, the resulting final compound may be recovered in a state of high purity by diluting the hydrolysis mass to a point where the amino-dihydroxyanthraquinone body crystallizes out in the form of a sulfate.

The concentration of sulfuric acid requisite for the purpose of hydrolysis may vary within wide limits. A strength of 93% has proven itself excellently suitable, although other concentrations between 60 and 100% are quite satisfactory. When the lower concentrations are used, the step of diluting the hydrolysis mass may be dispensed with, since in this case the sulfate of the aminodihydroxy body formed crystallizes out directly as the hydrolysis proceeds.

The hydrolysis is preferably carried out at elevated temperature. With sulfuric acid of 93% strength, a temperature range of 120 to 130° C. is excellently adapted for the reaction. Other temperatures, however, may be used, say within a range of 60° to 160° C. In general, the higher temperatures are to be preferred where the lower concentrations of acid are used, and vice versa.

The amino-dihydroxy-anthraquinone bodies thus obtained are valuable as intermediates for dyestuffs.

Without limiting our invention to any particular procedure, the following examples are given for the purpose of illustrating the same. Parts given are by weight.

Example 1:—Nitration 268 parts of 1,5-dimethoxy-anthraquinone are dissolved in 2680 parts of 93% sulfuric acid while maintaining the temperature below 20° C. The mass is agitated for half an hour and cooled to 10-15° C. 192 parts of a sulfuric acid-nitric acid mixture containing 36% of nitric acid are now added over a period of one to two hours. The temperature is maintained at 10-15° C. for three hours longer, and the mass is then agitated at room temperature for 12 hours. It is then drowned in water, and the precipitated 4-nitro-1,5-dimethoxy-anthraquinone is filtered off and washed acid free.

In a similar manner 1,8-dimethoxy-anthraquinone may be nitrated to produce the corresponding 4-nitro compound.

Example 2:—Nitration 268 parts of 1,5-dimethoxy-anthraquinone are dissolved in 2144 parts of sulfuric acid monohydrate at a temperature below 20° C. The mass is agitated for half an hour and cooled to 5° C. 384 parts of mixed acid (sulfuric acid and nitric acid) containing 138 parts of nitric acid are now added. The mass is held at 5-10° C. for 4 hours longer, and then agitated at room temperature for 12 hours. It is then drowned in water, and the precipitated 4,8-dintro-1,5-dimethoxy-anthraquinone is filtered off, and washed acid free.

The nitration of 1,8-dimethoxy-anthraquinone to the corresponding 4,5-dinitro body may be carried out in a similar manner.

Example 3:—Reduction 313 parts of 4-nitro-1,5-dimethoxy-anthraquinone, in the form of a wet cake as obtained in Example 1, are sludged up in 2500 parts of water. 80 parts of caustic soda are added, and when this is dissolved, 168 parts of sodium sulfhydrate in the form of a 20% aqueous solution are introduced. The mass is now brought to a boil and maintained so for thirty minutes. It is then filtered, washed and dried. The 4-amino-1,5-dimethoxy-anthraquinone thus obtained is a dark brown, bronzy powder soluble in alcohol with a bright red color and dyeing cellulose acetate material in brilliant red shades.

The reduction of 4-nitro-1,8-dimethoxy-anthraquinone to the corresponding amine may be carried out in a similar manner.

*Example 4:—Reduction*

358 parts of 4,8-dinitro-1,5-dimethoxy-anthraquinone in the form of a wet cake as obtained in Example 2 are sludged up in 3000 parts of water until thoroughly suspended. 100 parts of caustic soda are added. When this has dissolved, 4680 parts of a 20% aqueous solution of sodium sulfide are introduced. The mass is then heated to boiling, boiled for one hour, filtered hot, washed alkali-free and dried. The 4,8-diamino-1,5-dimethoxy-anthraquinone thus obtained is a dark brown, bronzy powder, dyeing cellulose acetate material a bluish red shade.

The reduction of 4,5-dinitro-1,8-dimethoxy-anthraquinone may be effected in a similar manner.

*Example 5:—Hydrolysis*

283 parts of 4-amino-1,5-dimethoxy-anthraquinone, as obtained in Example 3 are dissolved in 2830 parts of 80% sulfuric acid, at room temperature. The mass is then heated to 130–140° C. for two hours, cooled to 30–40° C., and poured into a large excess of cold water. The 4-amino-1,5-dihydroxy-anthraquinone formed is filtered off, washed acid free and dried. It is a purplish brown powder, dyeing cellulose acetate material in dull grayish shades.

The hydrolysis of 4-amino-1,8-dimethoxy-anthraquinone may be carried out in a similar manner.

*Example 6:—Hydrolysis*

298 parts of 4,8-diamino-1,5-dimethoxy-anthraquinone as obtained in Example 4 are dissolved in 1500 parts of 93% sulfuric acid and heated at 100° C. for 4 hours. The mass is cooled to 30–40° C., drowned in cold water, filtered, washed acid free, and dried to give 4,8-diamino-anthrarufin.

The hydrolysis of 4,5-diamino-1,8-dimethoxy-anthraquinone to give p-diamino-chrysazin may be effected in a similar manner.

*Example 7:—Hydrolysis and purification*

283 parts of 4-amino-1,8-dimethoxy-anthraquinone as obtained in Example 3 are dissolved in 1800 parts of 98% sulfuric acid and heated at a temperature of 80–150° C. for a period of 1 to 3 hours. The reaction mass is cooled to 20° C., and water is added slowly, while maintaining the temperature below 30° C., until the concentration of the acid has dropped to 65–70%. The sulfate of 4-amino-1,8-dihydroxy-anthraquinone separates out at this point, and is recovered by filtration, followed by washing with 65–70% sulfuric acid. The acid cake is now sludged up in hot water, filtered, washed acid free and dried. The mono-amino-chrysazin thus obtained is of high purity.

The same process may be applied to 4-amino-1,5-dimethoxy-anthraquinone, 4,5-diamino-1,8-dimethoxy-anthraquinone, and 4,8-diamino-1,5-dimethoxy-anthraquinone to give respectively highly pure mono-amino-anthrarufin, diamino-chrysazin and diamino-anthrarufin.

*Example 8:—Combined hydrolysis and purification*

298 parts of 4,5-diamino-1,8-dimethoxy-anthraquinone as obtained in Example 4 are dissolved in 3000 parts of 70% sulfuric acid, and heated at 100–150° C. for a period of 1 to 3 hours. The reaction mass is cooled to 20–40° C. and filtered. The filter cake constitutes diamino-chrysazin sulfate. It is washed with hot water until acid free to convert it into the free base and dried.

The combined hydrolysis and purification may also be applied to 4,8-diamino-1,5-dimethoxy-anthraquinone to produce highly pure p-diamino-anthrarufin.

It will be understood that many variations and modifications are possible in our preferred procedure above indicated, without departing from the spirit of this invention.

We claim:

1. The process of producing an amino-dihydroxy-anthraquinone from the group consisting of amino-anthrarufins and amino-chrysazins, which comprises nitrating the corresponding dimethoxy-anthraquinone, reducing the nitro body thus formed to the corresponding amine and hydrolyzing the amino compound to split off the methyl groups.

2. The process of producing an amino-dihydroxy-anthraquinone from the group consisting of mono-amino-anthrarufin, diamino-anthrarufin, mono-amino-chrysazin and diamino-chrysazin, which comprises nitrating the corresponding dimethoxy-anthraquinone, reducing the nitro body thus formed to the corresponding amine and hydrolyzing the amino compound to split off the methyl groups.

3. The process of producing an amino-dihydroxy-anthraquinone from the group consisting of amino-anthrarufins and amino-chrysazins, which comprises nitrating the corresponding dimethoxy-anthraquinone, reducing the nitro body thus formed to the corresponding amine and heating the amino compound in concentrated sulfuric acid whereby to hydrolyze off the methyl groups.

4. The process of producing an amino-dihydroxy-anthraquinone from the group consisting of amino-anthrarufins and amino-chrysazins, which comprises reacting upon the corresponding amino-dimethoxy-anthraquinone with sulfuric acid of 60 to 100% strength at a temperature above 60° C.

5. The process of producing a mono-amino-dihydroxy-anthraquinone of the group consisting of mono-amino-anthrarufin and mono-amino-chrysazin, which comprises reacting upon the corresponding mono-amino-dimethoxy-anthraquinone with concentrated sulfuric acid at a temperature between 60 and 160° C., diluting the reaction mass and recovering the precipitate.

6. The process of producing a diamino-dihydroxy-anthraquinone of the group consisting of diamino-anthrarufin and diamino-chrysazin, which comprises reacting upon the corresponding diamino-dimethoxy-anthraquinone with concentrated sulfuric acid at a temperature between 60 and 160° C., diluting the reaction mass and recovering the precipitate.

7. The process of producing an amino-dihydroxy-anthraquinone from the group consisting of amino-anthrarufins and amino-chrysazines, which comprises reacting upon the corresponding amino-dimethoxy-anthraquinone with sulfuric acid of 93–98% strength at a temperature of 80 to 150° C., diluting the reaction mass to about 65–70% acid concentration, recovering the precipitated sulfate of said amino-dihydroxy body, and reacting upon said sulfate with water to liberate the free amine.

8. The process of preparing diamino-antharufin which comprises reacting upon diamino-1,5-dimethoxy-anthraquinone with about 93% sulfuric acid at a temperature of 130–140° C., diluting the reaction mass and recovering the precipitate.

9. The process of preparing diamino-chrysazin which comprises reacting upon diamino-1,8-dimethoxy-anthraquinone with about 93% sulfuric acid at a temperature of 130 to 140° C., diluting the reaction mass and recovering the precipitate.

10. In the process of preparing an amino-dihydroxy-anthraquinone by hydrolyzing the corresponding amino-dimethoxy-anthraquinone by the aid of sulfuric acid, the step which comprises filtering off the reaction product from a sulfuric acid concentration of about 60–70%.

EDWIN C. BUXBAUM.
HENRY R. LEE.